United States Patent [19]
Sato et al.

[11] Patent Number: 5,396,338
[45] Date of Patent: Mar. 7, 1995

[54] RECORDING AND REPRODUCING SYSTEM

[75] Inventors: Yoshiaki Sato; Nobuya Sakai, both of Tokyo, Japan

[73] Assignee: Asahi Kogaku Kogyo Kabushiki Kaisha, Tokyo, Japan

[21] Appl. No.: 658,281

[22] Filed: Feb. 20, 1991

[30] Foreign Application Priority Data

Feb. 22, 1990 [JP] Japan .................................. 2-42187

[51] Int. Cl.⁶ .............................................. H04N 5/91
[52] U.S. Cl. ..................................... 358/341; 358/343
[58] Field of Search ............... 358/341, 343, 310, 335, 358/907; 360/19.1, 33.1, 49, 35.1

[56] References Cited

U.S. PATENT DOCUMENTS

| | | | |
|---|---|---|---|
| 4,510,531 | 4/1985 | Sugiyama et al. | 358/342 |
| 4,703,369 | 10/1987 | Moriyama et al. | 358/343 |
| 4,777,537 | 10/1988 | Ueno et al. | 358/341 |
| 4,896,224 | 1/1990 | Tobe et al. | 360/19.1 |

FOREIGN PATENT DOCUMENTS

0223423B1  5/1987  European Pat. Off. .
0379445A2  7/1990  European Pat. Off. .
250358  2/1990  Japan .

OTHER PUBLICATIONS

Engineering Department, Electronic Industries Association of Japan, "Specification of Still Video Floppy Disc Systems," Sep. 1987.

*Primary Examiner*—Tommy P. Chin
*Assistant Examiner*—Robert Chevalier
*Attorney, Agent, or Firm*—Sughrue, Mion, Zinn, Macpeak & Seas

[57] ABSTRACT

A recording and reproducing system for recording and reproducing an audio signal and video signals on a disk. In an AV mode of operation, an index signal is inserted in the audio signal to indicate transitions between the video signals corresponding to the audio signal. As a result, a plurality of video signals which correspond to the audio signal having an arbitrary length can be successively reproduced.

11 Claims, 7 Drawing Sheets

RECORDING AND REPRODUCING SYSTEM

BACKGROUND OF THE INVENTION

This invention relates to a recording and reproducing system whose typical example is an electronic still camera, in which video signals and audio signals are recorded, in combination, on coaxial tracks of a magnetic disk. The present disclosure relates to the subject matter contained in Japanese patent application No. Hei. 2-42187 (filed on Feb. 22, 1990) which expressly incorporated herein by reference in its entirety.

Electronic still cameras are designed to record video signals and audio signals on a magnetic disk. More specifically, in a normal mode, the video signals and the audio signals are recorded independently of each other. In contrast, in an AV mode, the video signals and the audio signals are recorded in combination. Therefore, the video signals and audio signals recorded in the normal mode are reproduced separately, and the video signals recorded in the AV mode are reproduced simultaneously when the corresponding audio signal is reproduced.

In a conventional electronic still camera, audio signals recorded in a plurality of tracks can be provided for a video signal recorded in a single track, but video signals recorded in a plurality of tracks cannot be provided for an audio signal recorded in a single track. Hence, it is rather difficult to successively reproduce different video images for different periods of time while an audio signal having an arbitrary length is being continuously reproduced.

SUMMARY OF THE INVENTION

In view of the foregoing, an object of this invention is to provide a recording and reproducing system in which the video signals recorded in a plurality of video tracks provided for the audio signal recorded on an audio track having an arbitrary length are reproduced successively for different periods of time with ease.

A recording and reproducing system according to the invention comprises: recording means for recording an audio signal and video signals corresponding to the audio signal on a recording medium; switch means for generating an index signal; control means responsive to an operation of the switch means for inserting the index signal in the audio signal for a subsequent recording operation on the recording medium; reproducing means for reproducing the audio signal having the index signal inserted therein, and for reproducing the video signals, from the recording medium; detecting means for detecting the index signal in the audio signal on the basis of the reproduced signal when the reproducing means reproduces one of the video signals corresponding to the audio signal; and changing means for switching the currently reproduced video signal to another of the video signals when the detecting means detects the index signal.

A recording device according to the invention comprises: recording means for recording an audio signal and video signals corresponding to the audio signal on respective audio and video tracks of a recording medium; switch means for generating an index signal; control means responsive to an operation of the switch means for inserting the index signal in the audio signal for a subsequent recording operation on the recording medium.

A reproducing device according to the invention comprises: reproducing means for reproducing an audio signal having an index signal inserted therein, and for reproducing video signals corresponding to the audio signal, from a recording medium in which the audio signal and the video signals have been recorded; detecting means for detecting the index signal in the audio signal on the basis of the reproduced signal when the reproducing means reproduces one of the video signals corresponding to the audio signal; and changing means for switching the currently reproduced video signal to another of the video signals when the detecting means detects the index signal.

DETAILED DESCRIPTION OF THE PREFERRED EMBODIMENTS

Figure 2:
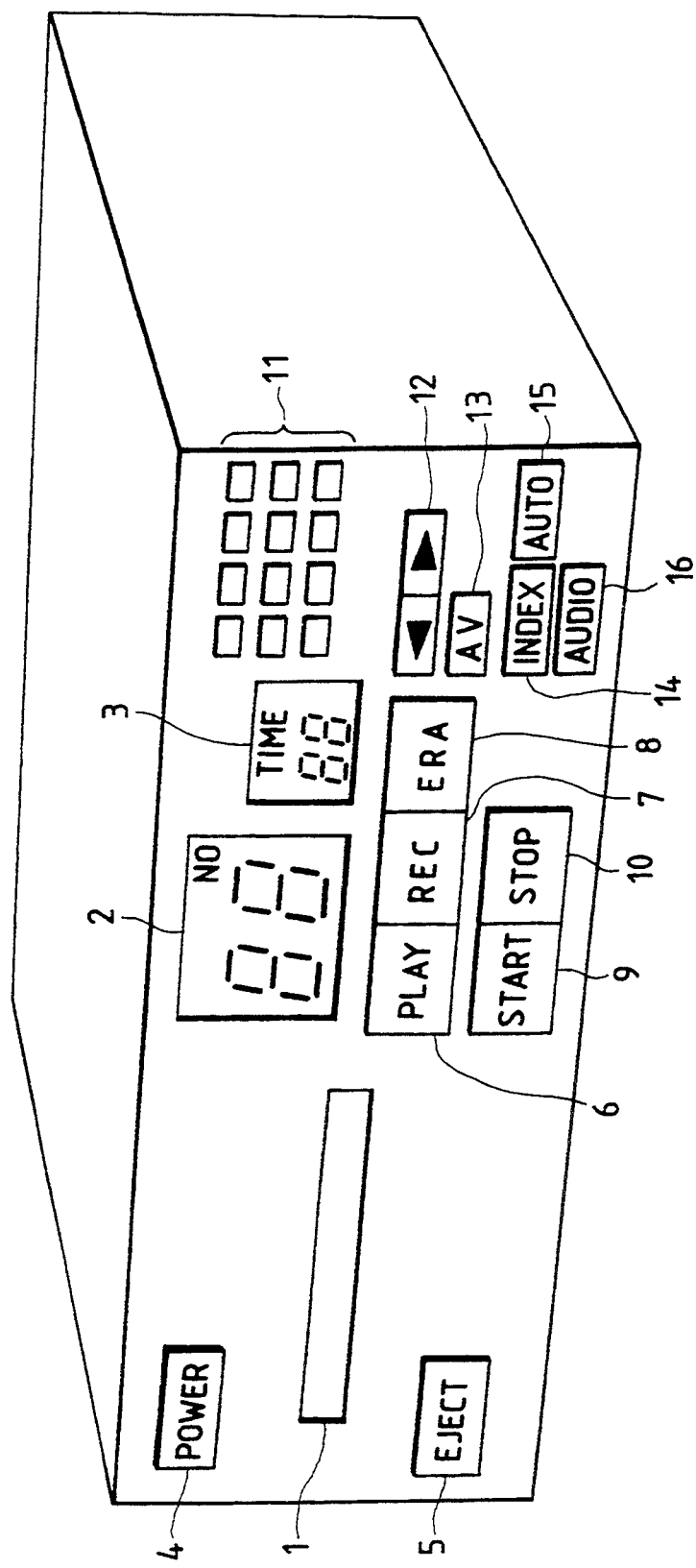
FIG. 2 is a perspective view illustrating an external appearance of the recording and reproducing system according to the invention.

FIG. 2 is a perspective view showing the external appearance of an example of one application of a recording and reproducing system according to this invention.

An opening 1 through which a magnetic disk is loaded in the device, display section 2 for displaying a track number, display section 3 for displaying a time, and various switches are provided on the front panel of the device. A power switch 4 is operated to turn on or off the power source, and an eject switch 5 is operated to eject the magnetic disk from the device. A play switch (PLAY) 6, a record switch (REC) 7, and an erase switch (ERA) 8 are operated to set a reproducing (playback) mode, a recording mode, and an erasing mode, respectively. A start switch (START) 9 and a stop switch (STOP) 10 are operated to start and stop the operation in each of the above-described operating modes.

A ten-key pad 11 is operated to input numerical data. A moving switch 12 is operated to make access to the track which is located one track radially inward or outward from the current track. An AV mode switch 13 is operated to set an AV mode. An index switch (INDEX) 14 is operated to record index signals successively. The index switch 14 is for making instructions for switching the video signal in the reproducing mode, which will be described later. An auto switch (AUTO) 15 is operated to automatically make access to tracks one after another. A sound receiving switch (AUDIO) 16 is operated to receive audio signals or to stop the reception of the audio signals. The stop switch 10 may be operated to stop the reception of audio signals.

Figure 3:
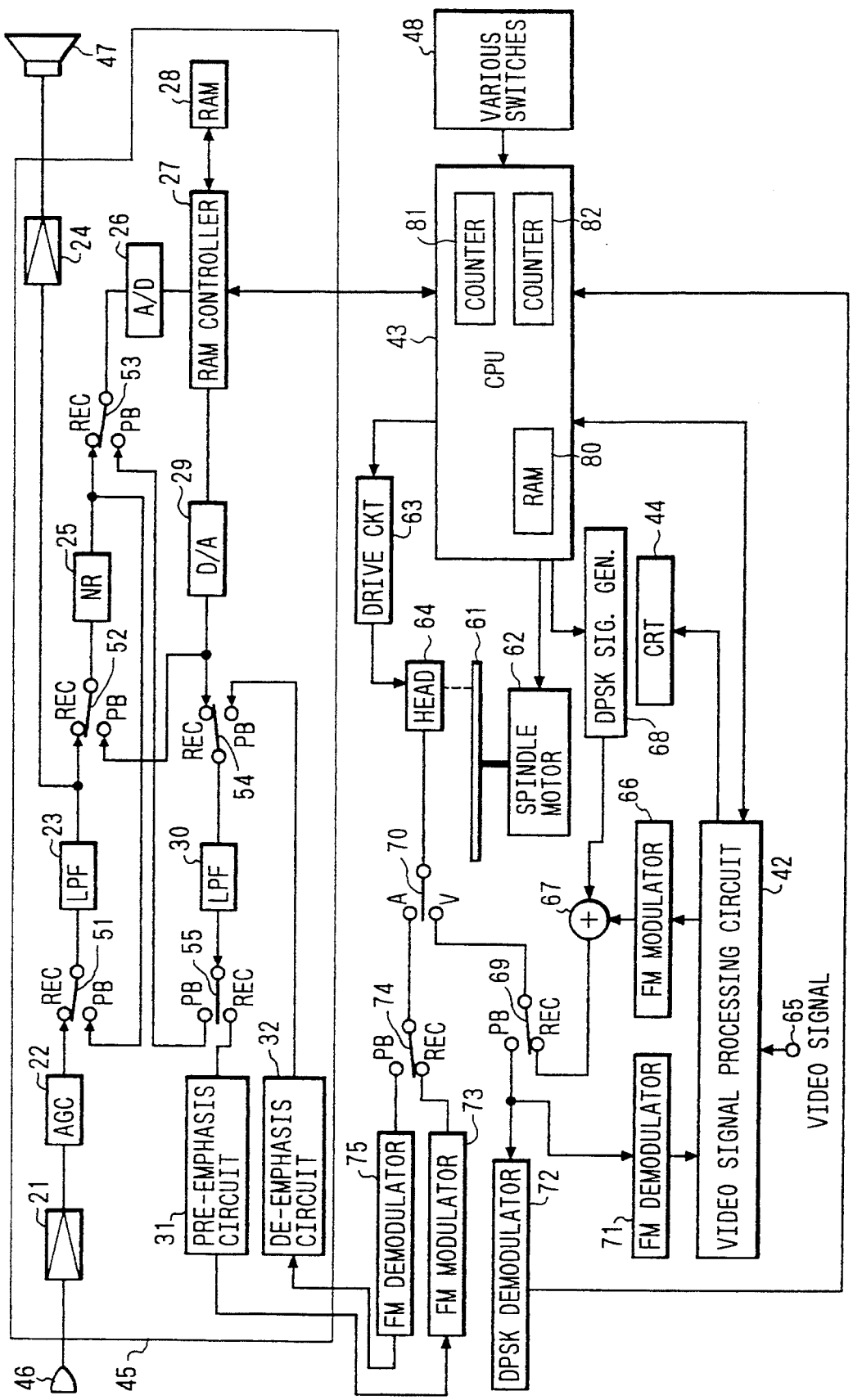
FIG. 3 is a block diagram illustrating an electrical arrangement of the recording and reproducing system according to the invention.

FIG. 3 is a block diagram showing the electrical arrangement of one example of the recording and reproducing system of the invention.

In the recording and reproducing system, as shown in FIG. 3, a disk 61 is rotated by a spindle motor 62, which is controlled by a CPU (central processing unit) 43 comprising a microcomputer. A drive circuit 63 connected to the CPU 43 positions a magnetic head 64 at a desired track. The CPU 43 receives signals which are provided when various switches 48 provided on the front panel of the device (shown in FIG. 2) are operated.

A video signal is input through an external input terminal 65, to which an image pickup circuit including an image pickup element such as a CCD (charge coupled device) is connected. The video signal is applied to a video signal processing circuit 42 where it is processed as normally required. The output of the video signal processing circuit 42 is applied to an FM modulator 66, where it is FM-modulated. The output of the FM modulator 66 is supplied to an adder 67. The adder 67 adds the output of the FM modulator 66 to the DPSK (differential phase shift keying) signal corresponding to the ID codes output by a DPSK signal generator 68. The result of the addition is applied through switches 69 and 70 to the magnetic head 64.

An output video signal from the magnetic head 64 is applied through the switch 70 and a switch 69 to an FM demodulator 71 and a DPSK demodulator 72. The FM demodulator 71 and the DPSK demodulator 72 separate, extract and demodulate the respective signals. The demodulated video signal is then applied to the video signal processing circuit 42. The video signal processing circuit 42 processes the demodulated video signal and outputs it to a CRT 44. The demodulated signal from the DPSK demodulator 72 is applied to the CPU 43. The CPU 43 reads the demodulated signal as the ID codes.

In an audio signal processing circuit 45, a recording audio signal input through a microphone 46 is supplied to a RAM (random access memory) 28 through an amplifier 21, an automatic gain control (AGC) circuit 22, a switch 51, a low-pass filter (LPF) 23, a switch 52, a noise reduction (NR) circuit 25, a switch 53, an A/D (analog-to-digital) converter 26, and a RAM controller 27. The recording audio signal read out of the RAM 28 (as an audio memory) is applied through the RAM controller 27, a D/A converter 29, a switch 54, a low-pass filter 30, a switch 55, a pre-emphasis circuit 31, an FM modulator 73, a switch 74 and the switch 70 to the head 64, so that it is recorded on the disk 61. The reproducing audio signal output from the head 64 is applied through the switches 70 and 74, an FM demodulator 75, a de-emphasis circuit 32, the switch 54, the low-pass filter 30, the switch 55, the switch 53, the A/D converter 26, and the RAM controller 27 to the RAM 28, where it is stored. The reproducing audio signal read out of the RAM 28 is applied to the loudspeaker 47 through the RAM controller 27, the D/A converter 29, the switch 52, the noise reduction circuit 25, the switch 51, the low-pass filter 23, and the amplifier 24. Further, in FIG. 3, the CPU 43, in response to outputs from various switches 48 (corresponding to the switches 6 through 16 in FIG. 2), the video signal processing circuit 42 and the audio signal processing circuit 45, controls the audio signal and video signal recording and reproducing operations. Furthermore, the CPU 43 controls the RAM controller 27 to insert an index signal to the audio signal and to detect the index signal. The CPU 43 includes a RAM (random access memory) 80. Further, the CPU 43 includes a counter 81 for a track number, and a counter 82 for a variable i which will be described later. In addition, the CPU 43 controls the switches 51 through 55 and the switches 69 and 74 in such a manner that the armature of each of these switches is tripped over to the contact REC when a signal recording mode is set, and the armature of each of these switches is tripped over to the contact PB when a signal reproducing mode is set. Further, the CPU 43 controls the switch 70 in such a manner that the armature of the switch is tripped over to the contact A when an audio signal is recorded or reproduced, and the armature of the switch is tripped over to the contact V when a video signal is recorded or reproduced.

Figure 4:
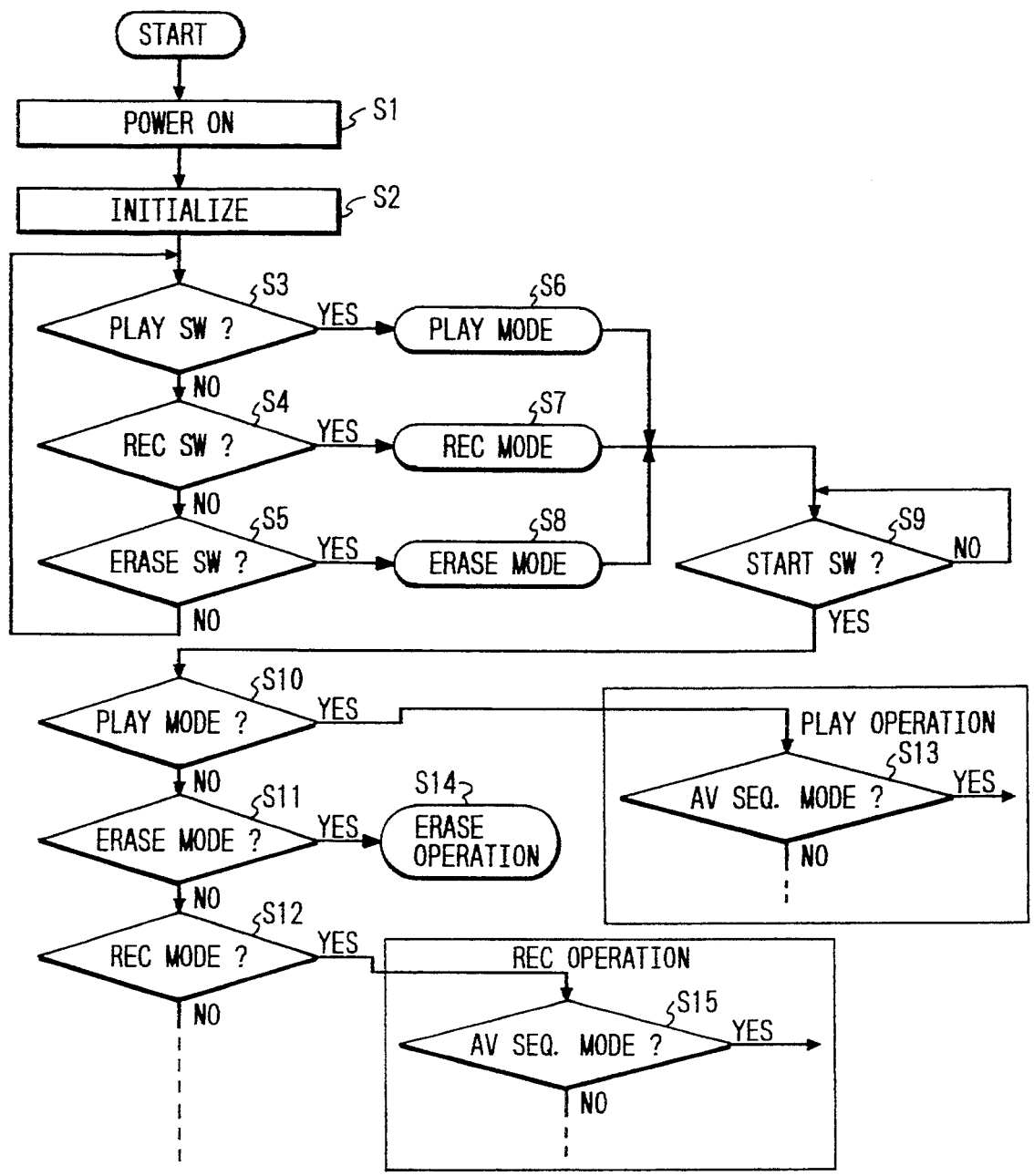
FIG. 4 is a flow chart illustrating the fundamental operation of the recording and reproducing system according to the invention.

The operation of the CPU 43 in response to operation of the switches will be described with reference to the flow chart of FIG. 4.

When the power switch 4 is turned on, the various circuits are electrically energized and initialized as required (Steps S1 and S2). Next, it is determined whether or not the play switch 6, the record switch 7 or the erase switch 8 have been operated (Steps S3, S4 and S5). In response to the operations of the play switch 6, the record switch 7 and the erase switch 8, the signal processing modes, namely, the signal reproducing mode, the signal recording mode, and the signal erasing mode are set, respectively (Steps S6, S7 and S8). Thereafter, it is determined whether or not the start switch 9 has been operated. When it is determined that the start switch 9 has been operated, then a signal reproducing (playback) operation, a signal recording operation or a signal erasing operation is started in accordance with the selected one of the signal processing modes (Steps S9 through S15).

Figure 1:
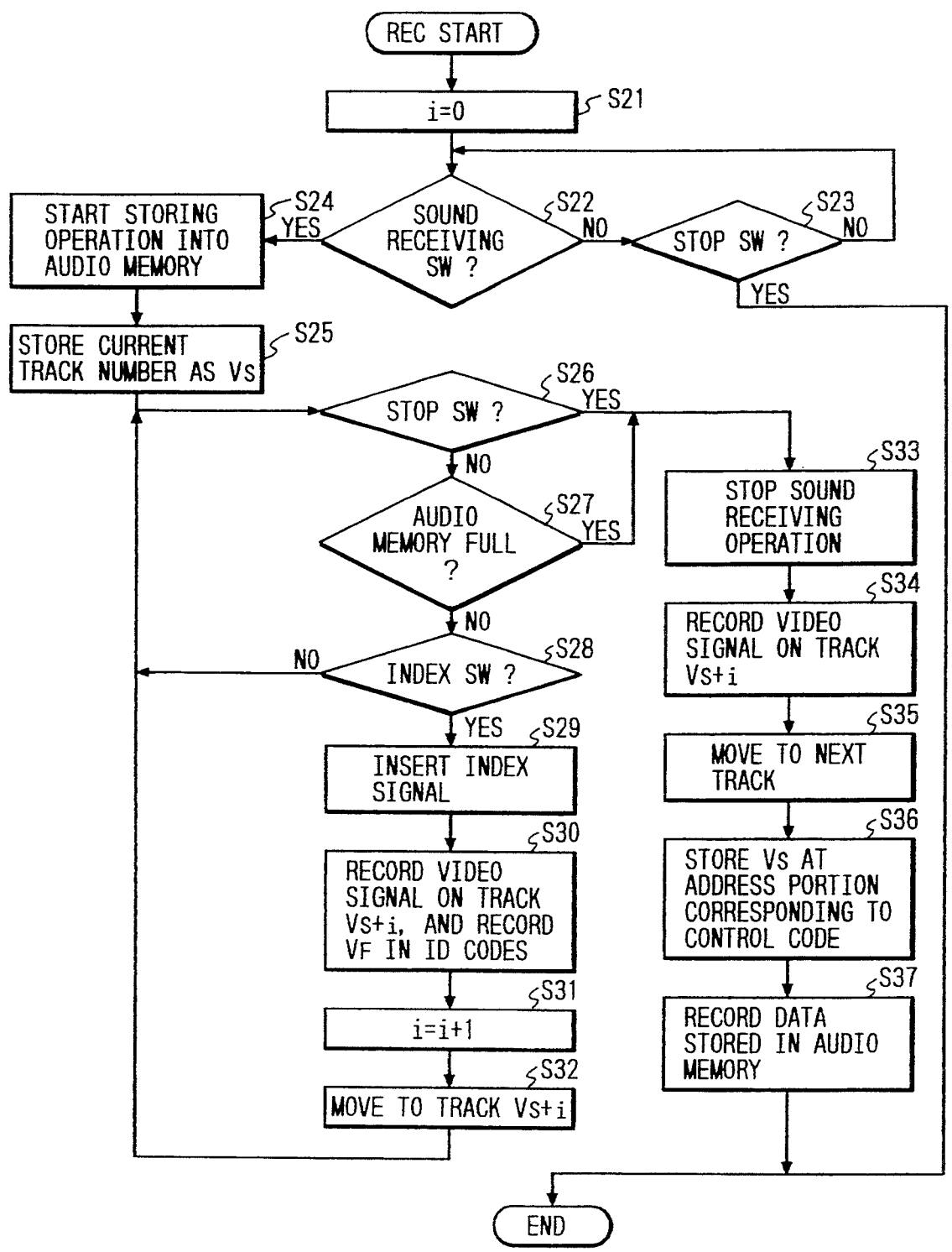
FIG. 1 is a flow chart illustrating the signal recording operation of one example of a recording and reproducing system according to this invention.

When, in the signal recording mode, the AV mode switch 13 is operated to specify the AV mode, then the CPU 43 operates as shown in the flow chart of FIG. 1.

First, a variable i is set to "0" in the counter 82 while the counter 81 for track number is set to a value specified by the operator (At this time, the head 64 is naturally positioned on the track specified by the operator.), and the CPU 43 waits until the sound receiving switch 16 is operated (Steps S21 and S22). If the stop switch 10 is operated before the sound receiving switch is operated, then the recording operation is suspended (Step S23).

When the sound receiving switch 16 is operated, a sound receiving operation, that is, a storing operation into the audio memory (RAM 28) is started (Steps S22 and S24). Namely, the audio signal received through the microphone 46 is applied to the audio signal processing circuit 45. In the audio signal processing circuit 45, the audio signal received is amplified by the amplifier 21, adjusted to a predetermined level by the automatic gain control circuit 22, and applied to the low-pass filter 23 through switch 51, so that unnecessary high frequency components are removed from the audio signal. The output of the low-pass filter 23 is applied through the switch 52 to the noise reduction circuit 25, so that it is compressed for noise reduction. The output of the noise reduction circuit 25 is applied through the switch 53 to the A/D converter 26, where it is subjected to analog-to-digital conversion. The resultant digital signal is applied through the RAM controller 27 to the RAM 28, where it is stored. Further, the number of the track where the head 64 is currently positioned is stored as $V_s$ in the RAM 80 in the CPU 43 (Step S25). The above sound receiving operation is carried out continuously until the stop switch 10 is operated or the audio memory (RAM 28) becomes full (Steps S26 and S27). At the same time, a part of the audio signal being received which has passed through the low-pass filter 23 is supplied through the amplifier 24 to the loudspeaker 47 so as to be monitored.

When the index switch 14 is operated during the sound receiving operation, the CPU 43 applies a control signal to the RAM controller 27 to cause the RAM controller 27 to output an index signal, which is inserted in the audio signal and stored in the RAM 28 (Steps S28 and S29). On the other hand, the video signal which is applied from the external input terminal 65 to the video signal processing circuit 42 is FM-modulated, and supplied to the head 64. The FM-modulated video signal is recorded on the current track $V_{s+i}$ ($V_s$ at first because i=0) where the head 64 is presently located, and the number $V_F (=V_{s+i+1})$ of the next track (for example, the track radially inward next to the current track) is recorded on the track $V_{s+i}$ using the user's area in the ID codes (Step S30). Here, the ID codes, including the data on the next track number $V_F$ are output as a DPSK signal from the DPSK signal generator 68. The DPSK signal is added to the FM-modulated video signal (through frequency multiplexing), and applied to the head 64 to record.

Thus, the FM-modulated video signal, for instance, of one field, and the DPSK signal containing data on the next track are recorded on one predetermined track.

Further, the video recording format applied to the present invention is proposed in "CPZ-250, SPECIFICATION OF STILL VIDEO FLOPPY DISC SYSTEMS" published by Engineering Department, Electronic Industries Association of Japan, in September 1987.

Upon completion of recording the video signal, the variable i in the counter 82 is increased by one, and the counter 81 for track number is increased by one (Step S31). Thereafter, the head 64 is moved radially inward to the next track ($V_{s+i}$), and Step S26 is effected again (Step S32).

The above-described operations are repeatedly carried out, so that the video signals corresponding to the audio signal being received are recorded on the respective tracks whenever the index switch 14 is operated.

The above-described operations can be started beginning with an arbitrary track. Setting i to "1" (i=1) does not mean that access is made to the first track (the track whose number is "1") of the disk.

Figure 5:
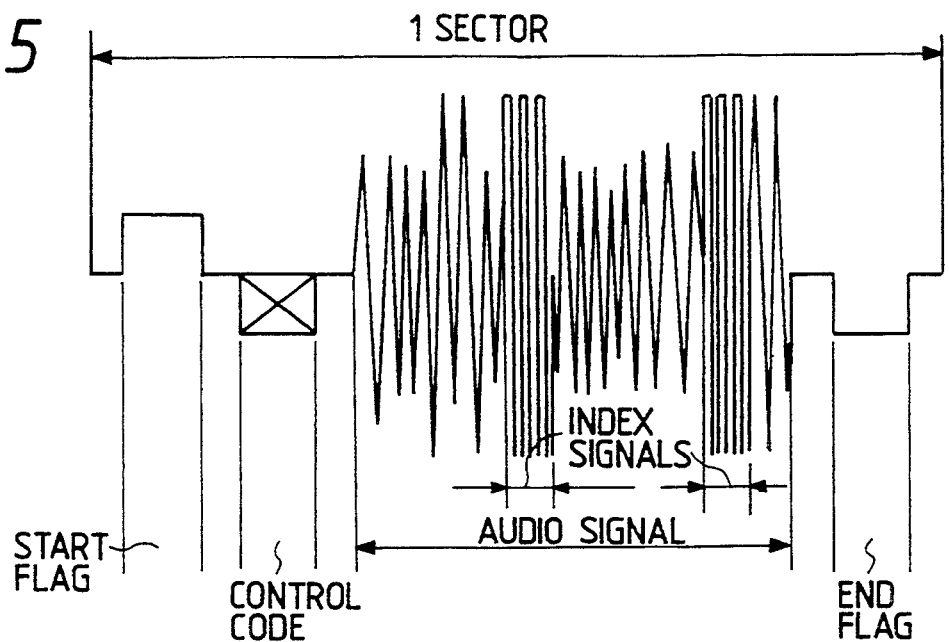
FIGS. 5 and 6 are waveform diagrams illustrating the operation of the device shown in FIG. 3.
Figure 6:
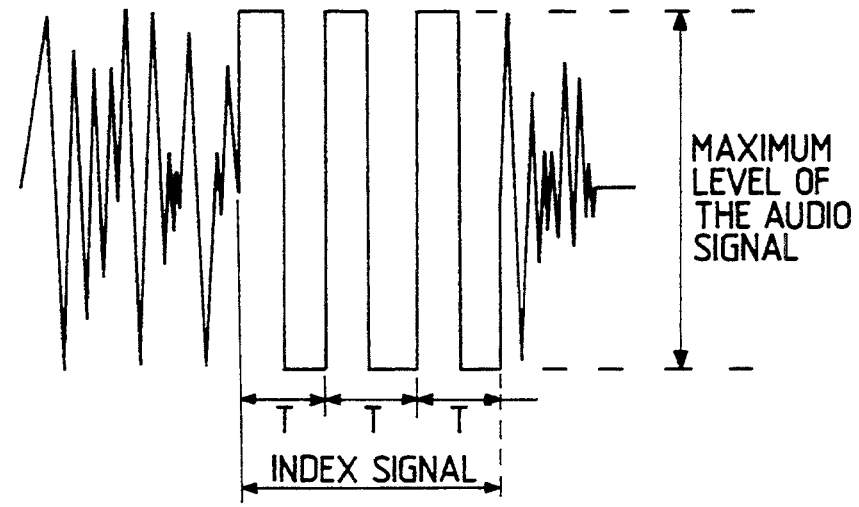

FIG. 5 is a waveform diagram of an example illustrating the index signal and audio signal thus recorded (stored) in analog form. Further, the audio recording format applied to the present invention is proposed in "CPZ-250, SPECIFICATION OF STILL VIDEO FLOPPY DISC SYSTEMS" published by Engineering Department, Electronic Industries Association of Japan, in September 1987. That is, the audio signal is assigned to sectors, each having a start flag set at the top, and followed by a control code, which is followed by an audio signal. In addition, an end flag is set at the end of the sector. In the case of this embodiment, as shown in an enlarged diagram of FIG. 6, a signal which has a level corresponding to the maximum level of the audio signal and a predetermined period T is inserted in the audio signal as the index signal for three cycles so as to be recorded. Further, the waveform of the index signal is not limited to a rectangle if the waveform can be discriminated from the audio signal.

Returning to FIG. 1, during the sound receiving operation, when the stop switch 10 is operated or the RAM 28 becomes full, the sound receiving operation is suspended, and the last video signal is recorded on the track $V_{s+i}$ (Steps S33 and S34). In this case, the next track number is not recorded.

The magnetic head 64 is moved radially inward to the next track (Step S35). Then, the number $V_s$ of the first video track is stored at an address portion corresponding to the control code (for example, word W3), in the RAM 28 (Step S36). Further, other control code data including the start flag and the end flag is also stored in the RAM 28. Finally, the data stored in the RAM 28 (audio memory) is recorded on the disk 61 (Step S37). Namely, the data read out of the RAM 28 is applied through the RAM controller 27 to the D/A converter 29, where it is subjected to a digital-to-analog conversion. The output of the D/A converter 29 is supplied through the switch 54 to the low-pass filter 30, so that the unnecessary high frequency components are removed from the audio signal. The resultant audio signal is applied to the pre-emphasis circuit 31, where it is subjected to pre-emphasis. The output of the pre-emphasis circuit 31 is applied to the FM-modulator 73. The FM-modulated audio signal from the FM-modulator 73 is applied through the switches 74 and 70 to the head 64, and recorded on the next track which is located radially inward from the track where the last video signal has been recorded.

Figure 7:
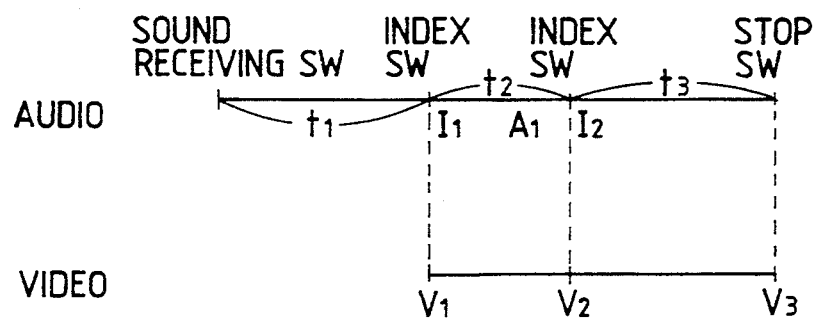
FIG. 7 is a timing chart illustrating the signal recording operation of the recording and reproducing system according to the invention.

FIG. 7 is a timing chart for the above-described operations.

When an arbitrary period of time $t_1$ passes from the time instant the sound receiving switch 16 is turned on to start the sound receiving operation, the index switch 14 is turned on; and when a period of time $t_2$ passes thereafter the index switch 14 is turned on again. Furthermore, when a period of time $t_3$ passes thereafter the stop switch 10 is turned on. As a result, the video signals $V_1$ through $V_3$ are recorded sequentially on the first through third tracks located radially inward in accordance with the timing of these switches 10, 14 and 16, respectively. In this operation, the number of the second track is recorded in the first track as a DPSK signal corresponding to the ID codes, and the number of third track is recorded in the second track as a DPSK signal. Furthermore, in the fourth track located radially inward next to the third track, the audio signal $A_1$ lasting for the reproducing time $(t_1+t_2+t_3)$ corresponding to those video signals is recorded through time-axis compression. The control code for the fourth track contains the number of the first track.

Figure 8:
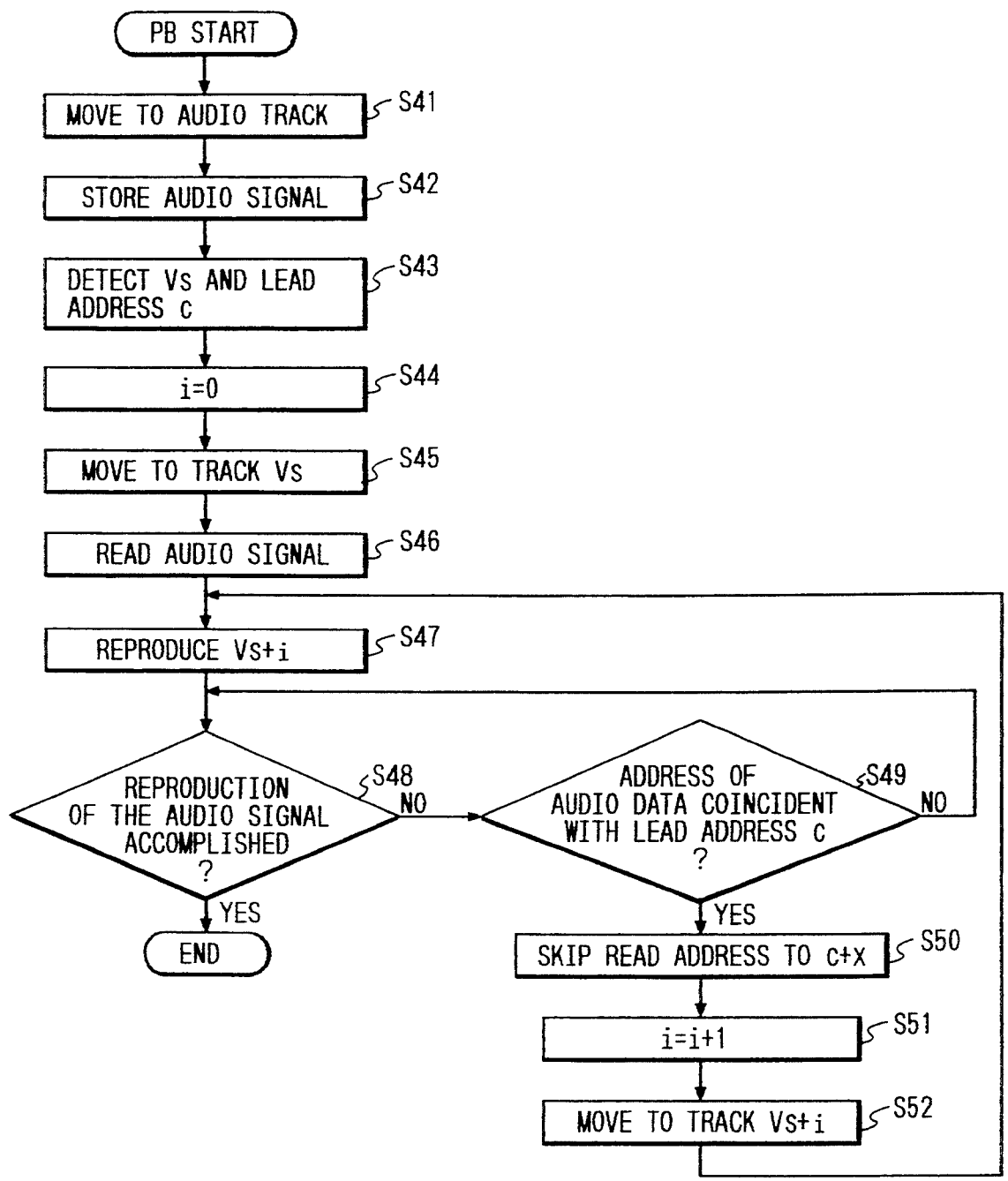
FIG. 8 is a flow chart illustrating the signal reproducing operation of the recording and reproducing system according to the invention.

The signal reproducing operation will be described with reference to the flow chart of FIG. 8.

When the signal reproducing mode is set, the CPU 43 makes discriminates between an audio track and a video track, and the CPU 43 drives the head 64 to detect a desired audio track according to the known manner and cause the head 64 to move to the audio track, so that the audio signal including the index signal and control code is reproduced therefrom and stored in the RAM 28 (Steps S41 and S42). That is, the reproducing signal from the audio track is FM-demodulated by the FM-demodulator 75, and is then subjected to de-emphasis in the de-emphasis circuit 32. The output audio signal of the de-emphasis circuit 32 is applied through the switch 54 to the low-pass filter 30, where unwanted high frequency components are removed therefrom. The audio signal passed through the low-pass filter 30 is applied through the switches 55 and 53 to the A/D converter 26, where it is subjected to analog-to-digital conversion. The output audio signal of the A/D converter 26 is applied through the RAM controller 27 to the RAM 28, where it is stored.

Figure 9:
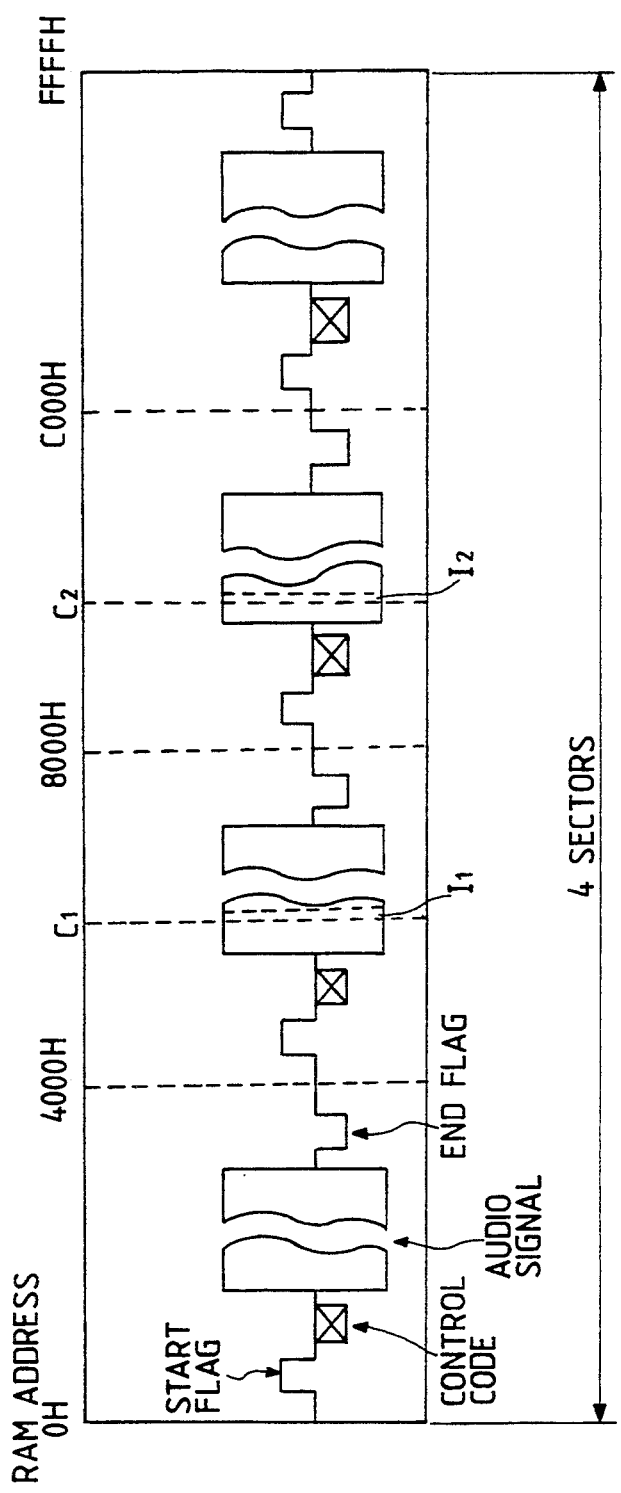
FIG. 9 is a diagram showing an example of the signal arrangement in an audio memory in the recording and reproducing system according to the invention.

The RAM controller 27 detects from the control code contained in the audio signal the number $V_s$ of the first track where the video signal corresponding to the audio signal has been recorded, and applies it to the CPU 43. Further, the RAM controller 27 detects a lead address c of the addresses where the index signal exists in the RAM 28 and applies it to the CPU 43 (Step S43). The index signal can be discriminated from the audio signal by detecting the same value existing cyclically (see FIG. 6). The RAM controller 27 can detect the index signal by monitoring the data in the RAM 28. Here, when a plurality of index signals are existent, all of the lead addresses are detected. For example, when two index signals $I_1$ and $I_2$ are existent, lead addresses $c_1$ and $c_2$ are detected, as shown in FIG. 9.

Next, the variable i is set to "0" in the counter 82, and the head 64 is moved to the track Vs where the first video signal has been recorded (Steps S44 and S45). Thereafter, the audio signal stored in the RAM 28 is read through time-axis expansion, and simultaneously the video signal on the track $V_{s+i}$ ($V_s$ at first because i=0) is reproduced (Steps S46 and S47).

More specifically, the CPU 43 causes the head 64 to moved to the track $V_s$ whose number is read from the control code. In this operation, the superimposed signal of the FM video signal and the DPSK signal reproduced through the head 64 is divided into the respective signal components, and demodulated. The demodulated signal from the FM demodulator 71 is applied to the video signal processing circuit 42. The video signal processing circuit 42 processes the video signal as required, and applies it to the CRT 44. The DPSK signal from the DPSK demodulator 72 is applied to the CPU 43 as the ID codes.

The audio signal written in the RAM 28 is read out through time-axis expansion, and applied through the RAM controller 27 to the D/A converter 29, where it is subjected to digital-to-analog conversion. The output of the D/A converter 29 is applied through the switch 52 to the noise reduction circuit 25. In the noise reduction circuit 25, the input audio signal is expanded for noise reduction. The audio signal thus processed is applied through the switch 51 to the low-pass filter 23, where unwanted high frequency components are removed from the audio signal. The audio signal thus processed is applied through the amplifier 24 to the loudspeaker 47.

In the case where the reproduction of the video signal is started in this way, when the index signal is detected before the reproduction of the audio signal from the RAM 28 is accomplished, that is, when an address of the audio data being currently digital-to-analog converted is coincident with the lead address c previously detected, the read address in the RAM 28 is skipped to c+x (Steps S48 through S50). Here, x represents the amount of the addresses which the index signal occupies. In Step S50, skipping the read address in the RAM 28 to c+x prevents the index signal from being applied to the D/A converter 29. That is, the index signal is not reproduced as the audio signal. Thereafter, the variable i is increased by one (1), and the head 64 is moved to the radially inward next track $V_{s+i}$ ($V_F$) where the next video signal has been recorded, so as to reproduce that track (Steps S51 and S52).

When the reproduction of the audio signal is accomplished, the reproducing operation is suspended (Step S48). Thus, the series video signals are reproduced successively from the tracks with the same timing as they were recorded.

Figure 10:
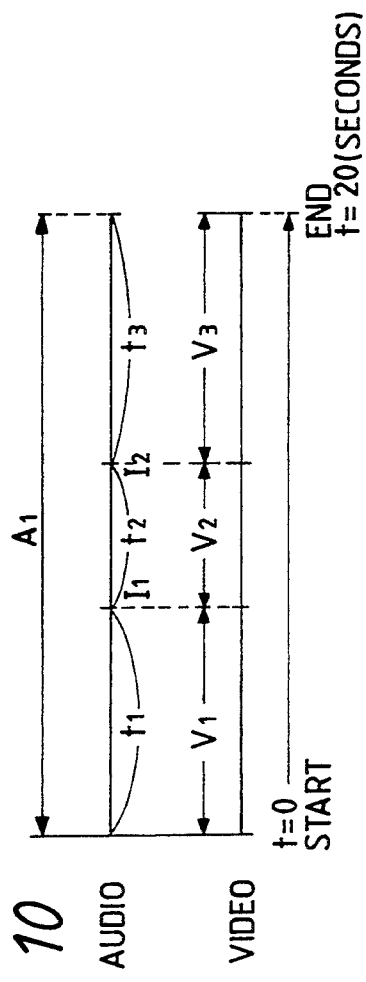
FIG. 10 is a timing chart illustrating the signal reproducing operation of the recording and reproducing system according to the invention.

A timing chart for this signal reproducing operation is as shown in FIG. 10. Upon start of the signal reproducing operation, the first video signal $V_1$ is first reproduced, and when the index signal $I_1$ is detected with the lapse of the period of time $t_1$, the next video signal $V_2$ is reproduced for the period of time $t_2$. When the next signal $I_2$ is detected, the last video signal $V_3$ is reproduced.

Note, while the video signals are reproduced in the above-described manner, the corresponding audio signal $A_1$ is reproduced continuously for the period of time $(t_1+t_2+t_3)$.

In the above-described embodiment, in each video track the number of the next video track is recorded as the DPSK signal, and in the audio track the number of the first video track is recorded. However, the recording of these numbers can be omitted in the case where the video track to be reproduced next can be recognized in advance.

As is apparent from the above description, in the disk recording device of the invention, when the index switch is operated while the audio signal to be recorded in the disk is being stored in the memory unit, the index signal is stored in the memory unit with the timing of the operation of the index switch. Therefore, the method can be employed in which, at the time of reproduction, the video track is switched with the timing of detection of the index signal.

Furthermore, in the disk reproducing device of the invention, when the index signal is detected from the audio signal being read out, the video track to be reproduced is switched. Therefore, a plurality of video signals corresponding to an audio signal having an arbitrary length can be reproduced successively while being switched with the predetermined timing, with ease.

What is claimed is:
1. A recording and reproducing system comprising:
  recording means for recording an audio signal and a plurality of video signals corresponding to said audio signal on a recording medium;
  index signal generating means for generating an index signal for use in controlling reproduction of said video signals;
  control means responsive to an operation of said index signal generating means for inserting the index signal in the audio signal during a recording operation of said recording means subsequent to operation of said index signal generating means;
  reproducing means for reproducing the audio signal having the index signal inserted therein, and for reproducing the plurality of video signals, from the recording medium;

detecting means for detecting the index signal in the reproduced audio signal while said reproducing means is reproducing one of the plurality of video signals corresponding to the audio signal;

changing means for switching the currently reproducing video signal to another of the plurality of video signals when said detecting means detects said index signal; and memory means for storing the audio signal including the index signal inserted therein, before recording said audio signal on the recording medium and for also storing said audio signal having the index signal inserted therein at the time of reproducing said audio signal from the recording medium; and wherein said index signal is stored at a number of addresses in said memory means, and wherein said reproducing means skips over said number of addresses in said memory means while it reproduces the audio signal.

2. A recording and reproducing system as recited in claim 1, wherein said detecting means detects the index signal by detecting a lead address of said plurality of addresses.

3. A recording and reproducing system as recited in claim 1, wherein each video track is associated with a track number, wherein a current video signal is recorded on a current video track and a next video signal following said current video signal is recorded on a next video track, and wherein said recording means further records on said current video track data for the track number of said next video track.

4. A recording and reproducing system as recited in claim 1, wherein said recording medium is a disk, and said recording means records the audio signal and the video signals on respective audio and video tracks of said disk.

5. A recording device comprising:

recording means for recording an audio signal and at least first and second video signals corresponding to said audio signal on respective audio and video tracks of a recording medium, said recording means including memory means for storing said audio signal at a plurality of address locations before recording said audio signal on said recording medium, and means for subsequently reading the stored audio signal out of said memory for recording to said medium;

index signal generating means for generating an index signal designating a shift from said first video signal to said second video signal during reproduction from said recording medium; and control means responsive to an operation of said index signal generating means for inserting the index signal in the audio signal during a recording operation of said recording means subsequent to operation of said index signal generating means, said control means including means for storing said index signal at a plurality of address locations in said memory and for reading said index signal out of said plurality of address locations for recording to said medium whereby on reproduction said audio signal including said index signal can be reproduced and stored in memory locations, and the memory location storing said index signal can be skipped over when reproducing said audio signal.

6. A recording device as recited in claim 5, wherein said recording means further records, while recording a current video signal on a current video track of said recording medium, and further records on said current video track data for the number of a next video track in which a next video signal following the current video signal is to be recorded.

7. A recording device as recited in claim 5, wherein said recording medium is a disk, and said recording means records the audio signal and the video signals on respective audio and video tracks of said disk.

8. A reproducing device comprising:

reproducing means for reproducing an audio signal having an index signal inserted therein, and for reproducing a plurality of video signals corresponding to said audio signal, from a recording medium in which said audio signal and said plurality of video signals have been recorded;

detecting means for detecting the index signal in the audio signal when said reproducing means reproduces one of the plurality of video signals corresponding to the audio signal;

changing means for switching the currently reproduced video signal to another of the plurality of video signals when said detecting means detects said index signal; and memory means for stoking the audio signal including the index signal at the time of reproducing said audio signal from the recording medium;

wherein said index signal is stored at a number of addresses in said memory means, and wherein said reproducing means skips over said number of addresses in said memory meads while it reproduces the audio signal.

9. A reproducing device as recited in claim 8, wherein said detecting means detects the index signal by detecting a lead address of said plurality of addresses.

10. A reproducing device as recited in claim 8, wherein said recording medium is a disk, and the audio signal and the plurality of video signals are recorded on respective audio and video tracks of said disk.

11. A recording and reproducing method comprising the steps of:

generating an index signal;

inserting the index signal in an audio signal;

recording said audio signal, containing said index signal, and a plurality of video signals corresponding to said audio signal on a recording medium;

reproducing the audio signal having the index signal inserted therein, and reproducing the plurality of video signals, from the recording medium;

storing in a memory the audio signal including the index signal at the time of reproducing said audio signal from the recording medium said index signal being stored at a number of addresses in said memory, detecting the index signal in the audio signal when one of the plurality of video signals corresponding to the audio signal is reproduced;

skipping over said number of addresses in said memory means while continuing to reproduce said audio signal: and switching the currently reproduced video signal to another of the plurality of video signals when said index signal is detected.

* * * * *